Oct. 5, 1948. R. H. UPSON Re. 23,042

STALL WARNING DEVICE

Filed Aug. 25, 1947

INVENTOR
RALPH H. UPSON
BY Raymond A. Thomas
ATTORNEY

Reissued October 5, 1948

Re. 23,042

UNITED STATES PATENT OFFICE 23,042

STALL WARNING DEVICE

Ralph H. Upson, Minneapolis, Minn.

Original No. 2,406,719, dated August 27, 1946, Serial No. 513,241, December 7, 1943. Application for reissue August 25, 1947, Serial No. 770,362

12 Claims. (Cl. 200—83)

This invention relates to a stall warning device for aircraft, and, in particular, it relates to a stall warning device which functions by reason of the movement of the air pressure lines at the leading edge of an aircraft wing. More particularly, the invention relates to a device applicable for association with the leading edge of an aircraft wing for producing an audible and/or visible signal upon approaching a stall as a result of a high angle of attack.

Heretofore, it has been general practice for pilots to depend upon air speed indicators and their own observations or senses in order to determine the approximate point of approach of a stall. Some instruments have been devised to warn the pilot of an approaching stall. However, devices that are available are objectionable in many respects. For example, some only warn that a stall is actually in progress; others suffer from unreliability due to dependence on air speed. Some employ outwardly projecting mechanisms which, because of such features, constitute obstructions which may be bent or otherwise injured, thus impairing the accuracy of the device. Furthermore, such outwardly projecting portions permit the accumulation of ice thereon, or are subject for encounter with various foreign material such as sand, animal life, or the like. Also, most exterior attachments placed on aircraft and particularly in the vicinity of the wing are objectional from the standpoint of interference with proper air flow.

In accordance with the practice of my invention I have provided a simple dependable stall warning device which is particularly applicable for installation within the interior of an aircraft wing, thus avoiding all exterior interferences. In general, the invention comprises a tubular element having an opening at the leading edge portion of an aircraft wing and extending to a chamber enclosing a membranous diaphragm. This diaphragm supports an electrical contact which is operable upon movement of the slack diaphragm due to movement of the stagnation point at the leading edge of the wing. The electrical contact as thus established results in an audible and/or visible signal in the vicinity of the pilot.

Among the advantages of my invention are, to provide a stall warning device which is unitary in construction; economical of manufacture; free from outwardly projecting portions; positive in operation; and, sensitive in operation in combination with a relatively large movement of contact points whereby uncertainty of operation caused by vibration is eliminated. Other advantages of the invention are ease of installation, serviceability, simplicity of structure, and reduction of moving elements. The construction of the device provides for removal of water or condensation and permits the application of heating means to prevent ice formation at the intake end of the device. A single size device is applicable for use regardless of the size or shape of the airfoil section of the wing, it merely being necessary to locate the intake end of the device on the leading edge of the wing in proper relationship with the stagnation point in advance of the angle of stall.

These and other objects and advantages will appear more fully in the following detailed description when considered in connection with the accompanying drawing, in which.

Figure 1:
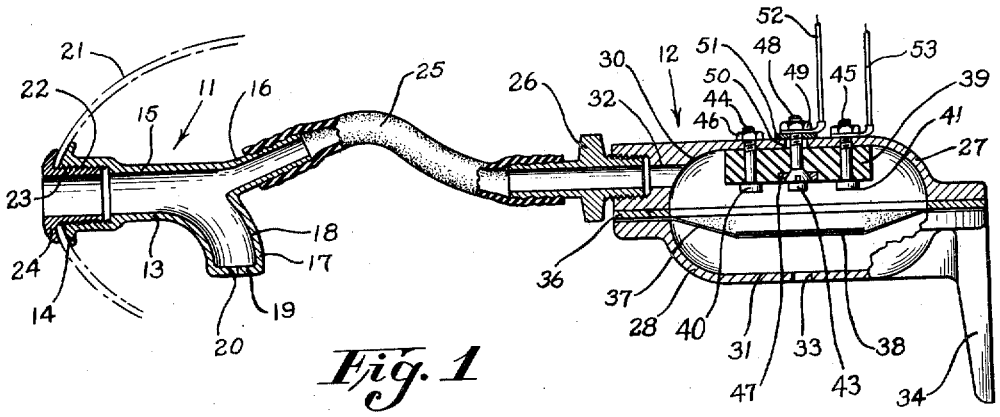
Figure 1 is a side elevational view in section, of an embodiment of my invention.
Figure 2:
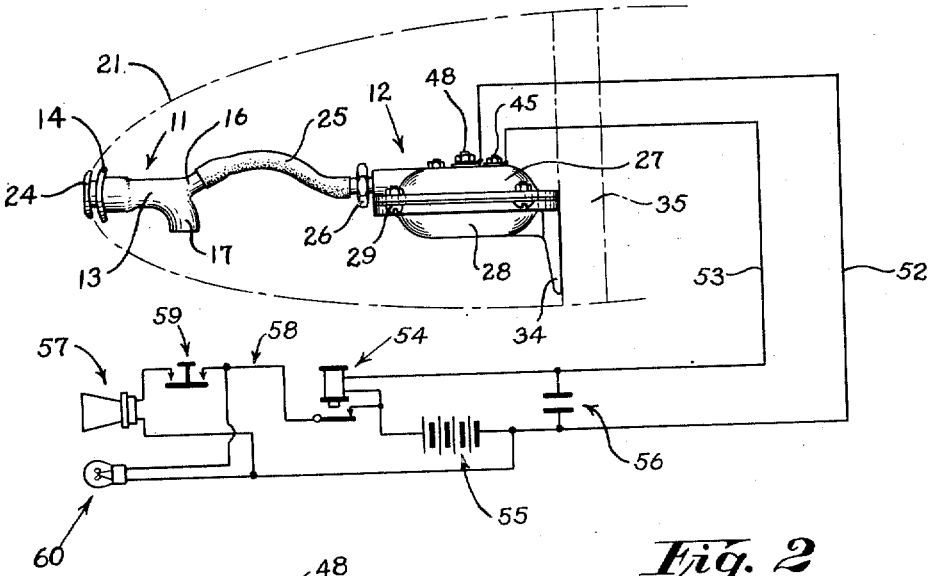
Figure 2 is a side elevational view of an embodiment of my invention in combination with a diagrammatic view of an electrical system associated therewith.

With reference to the drawing, and in particular to Figures 1 and 2, I show an embodiment, in the form of a stall warning device, comprising, in general, an attachment 11 to be secured to the leading edge of an aircraft wing, and a housing 12 adapted to retain means for forming an electrical contact due to a change in pressure within the housing.

The attachment 11 comprises a main body 13 having a flanged portion 14 at its foremost end, and an aperture 15 extending through the body 13. Projecting from the body 13 and in an upwardly angular position is a tubular portion 16, the aperture of which forms a continuation of the aperture 15. Another portion 17 extending downwardly from the body 13 includes a chamber 18 also communicating with the main aperture 15. The downwardly extending portion 17 is provided with an end enclosure 19 through which there is a small aperture 20. Since the principal aperture 15 is open to the leading edge of an aircraft wing, there is a possibility that water or moisture may enter such aperture. Therefore, the chamber 18 which extends downwardly from the aperture 15 functions to collect such water or condensation and allow it to drop out through the small opening 20. It is necessary to maintain the opening 20 a relatively small size so that it will not interfere with the pressure operation of the device. I have found that good results are obtained by limiting the size of the opening 20 to approximately .075'' in diameter, or a size in area of about 1/23 of the area of the aperture 15.

The reference character 21 designates the skin of the leading portion of an aircraft wing. The flanged portion 14 of the attachment 11 is curved so that it will conform substantially to the shape of the skin 21 at the leading edge of an aircraft wing. Internal threads 22 are provided in the body 13 adjacent to the flanged portion 14. An externally threaded tubular member 23 having a head portion 24 is adapted to be threaded in complementary engagement with the body 13 in a manner so as to clamp the attachment 11 in tight relationship with the skin 21. The opening within the tubular member 23 is in alignment with the aperture 15, thus forming a direct communication to the atmosphere from the leading edge of an aircraft wing to the tubular portion 16.

A rubber or flexible tubing 25 connects the tubular portion 16 with a tubular adapter 26 associated with the housing 12. In general, the housing 12 comprises an upper case 27 and a lower case 28 secured together by means of machine bolts 29. The cases 27 and 28 are formed so as to provide annular cavities 30 and 31, respectively. An aperture 32 forms a communication between the cavity 30 and the tubular adapter 26, thus forming a complete line of communication from the leading edge of the aircraft wing to the upper cavity 30. The lower cavity 31 is provided with an aperture 33 permitting the cavity 31 to communicate directly with another pressure point, preferably, the prevailing atmospheric pressure a close approach to which is normally induced within the wing. A bracket 34 extends from the lower case 28 providing means for the attachment of the inlet to a spar 35 (Figure 2) or other structural member within the wing of the aircraft.

Clamped between the upper and lower cases 27 and 28 is a ring 36 to which is secured a slack diaphragm 37. The diaphragm 37 is preferably cemented to the ring 36 in order to maintain the diaphragm in proper desired position and to facilitate its assembly with the housing 12. The diaphragm 37 is formed of a thin sheet or film of flexible, preferably slack, material of such nature that it will readily flex upon a change of air pressure, particularly a reversal of pressure between its two surfaces. The diaphragm 37 may be composed of a thin sheet of rubber, or synthetic rubber, or other materials such as leather or treated fabric. The diaphragm should be light but impervious to air, or substantially so, and capable of retaining a suitable flexibility under conditions of moisture or extreme cold. Positioned centrally of the diaphragm 37 is a metallic disc 38 cemented to the diaphragm 37 and functioning as an electrical contact member. This disc 38 is relatively light in weight, and I have found that good results have been obtained by forming a disc from brass or copper shim stock of a thickness of approximately .0025'' to .014''.

Figure 3:
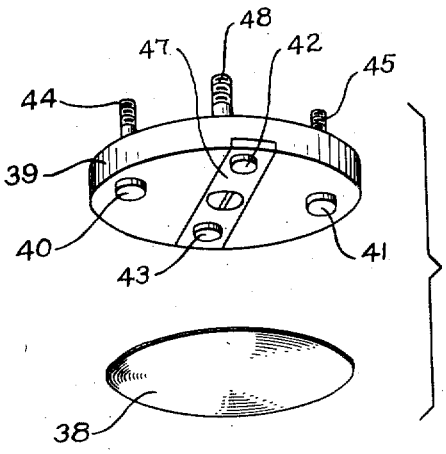
Figure 3 is a perspective view of details of the electrical contact means employed in the device of my invention.

Concentrically with the disc 38 is an electrically insulating disc 39 supporting electrical contacting points 40, 41, 42 and 43 (Fig. 3). The points 40 and 41 form, in effect, the heads of bolts 44 and 45, respectively, attached by means of nuts 46 to the upper case 27. These two points 40 and 41 are, therefore, grounded directly to the metallic case 27. The contact points 42 and 43 are joined together by a metallic bar 47 which, in turn, is held in place by the machine screw 48 extending upwardly through the case 27 where the screw is retained by a nut 49. An enlarged aperture 50, through the case 27, insures that the screw 48 will not contact the metal of the case 27. Also, an electrically insulating washer 51 maintains the nut 49 in spaced relationship with the case 27. Wires 52 and 53 engaging with the bolts 44 and 45, respectively, extend to the electrical system, hereinafter described. By this arrangement of contacting points, it is merely necessary for the contact disc 38 to engage any two adjacent contact points 40, 41, 42 or 43 in order to complete a circuit between wires 52 and 53.

A diagram of the electrical system is shown in Figure 2. The wires 52 and 53 lead to a conventional relay 54, and a battery 55 is connected in the line of the wire 52. Also, a fixed condenser 56 lies between the wires 52 and 53. The wire 52 extends directly to a horn 57. Instead of a horn it is to be understood that a bell, buzzer, or other electrically operated audible signal may be used. The wire 58 extends between the relay 54 and the horn 57, and a conventional break-type push button 59 provides means for interrupting current through the line 58. In addition to the audible signal 57, there is provided a visual signal 60 in the form of a light bulb. This light bulb connects directly with the wire 52, and with the wire 58 at a point between the relay 54 and the push button 59.

In the operation of the device the body 13 containing the main aperture or orifice 15 is attached to the leading edge of an aircraft wing, at a location which is relatively free from disturbing influences such as the slip stream produced by the propeller. In respect to the cord of the wing, the orifice is located on any particular aircraft in accordance with a position determined by calculation or actual test. For normal flight conditions the orifice is located in relation to the stagnation point at the leading edge of the wing so that the orifice will lie in a positive pressure zone. Under such conditions, the slack diaphragm 37 will lie in its lowermost position, as illustrated in Figure 1 of the drawing. Even if conditions are such as to produce a neutral pressure, the diaphragm 37 will still lie in a normal relaxed position because of gravity acting upon the diaphragm and the contact disc 38. However, in the event the angle of attack of the wing becomes such as to approach a stall, the pressure lines at the leading edge of the wing change so as to produce a negative pressure zone at the orifice position. As soon as a negative pressure is reached at the leading edge orifice, the slack diaphragm is caused to move upwardly until the contact disc 38 engages with two or more of the contact points 40, 41, 42 or 43. This action completes an electrical circuit which functions through the relay 54 to cause both an audible sound by means of the horn 57, and a visual signal by means of the light bulb 60.

It will be noted that the aperture 33 in the lower case 28 opens the cavity 31 to the prevailing atmosphere thus allowing the diaphragm 37 to move upwardly due to the negative pressure within the cavity 30. In order to complete an electrical circuit between the contacting disc 38 and its complementary engaging contact points, a substantial movement of the diaphragm is required. This is particularly desirable because the relatively wide space between the contact disc and its complementary contact points prevents the occurrence of any incorrect signals due to vibration, warping, misalignment of parts, or a very slight momentary reduction of pressure within the cavity 30. To attain the advantages of this condition, I have found it essential to maintain the contacting elements a distance of at least one-eighth of an inch apart, preferably one-quarter inch apart.

In certain cases, such as during the initial start of a take-off, or toward the end of a landing, the stalling angle of the plane will have been reached and the audible signal will occur. When such an expected occurrence takes place, the pilot may, if he so desires, operate the push-button 59 so as to break the circuit leading to the audible signal. This push-button does not cut off the visual signal. The advantage of the push-button 59 is merely to cut off the audible signal at such time that instructions may be given the pilot from an air field control tower. This temporary disconnection of the audible signal in no way interferes with the functioning of the visual signal during periods wherein a stall is likely to occur.

As thus described, it is believed apparent that I have provided a novel and unique device for automatically signalling the pilot upon an approaching stall, and while I have described a preferred embodiment of my invention, it is to be understood that it is susceptible of those modifications which appear obviously within the spirit of the invention and as appearing within the scope of the appended claims.

Having thus described my invention, what I claim and desire to protect by Letters Patent, is:

1. In an airplane angle-of-attack indicator, a conduit having an open end adapted for engagement with the leading edge of an airplane wing, a rigid casing communicating with the conduit, a flexible slack impervious diaphragm supported by the casing and dividing the casing into separate compartments, means carried by the casing for actuating a signal, and means carried by the diaphragm for operating said actuating means, said diaphragm being dependent upon its gravitational weight to maintain the means carried by the diaphragm normally out of actuating relationship, the communication between said casing and conduit being directed to one compartment whereby a reduced air pressure at the open end of said conduit functions to actuate the diaphragm.

2. In an airplane angle-of-attack indicator, a conduit having an open end adapted for engagement with the leading edge of an airplane wing, a downwardly extending tubular member communicating with the conduit and having a relatively small opening at the lowermost portion thereof, a rigid casing communicating with the conduit, a flexible slack impervious diaphragm supported by the casing and dividing the casing into separate compartments, means carried by the casing for actuating a signal, and means carried by the diaphragm for operating said actuating means, said diaphragm being dependent upon its gravitational weight to maintain the means carried by the diaphragm normally out of actuating relationship, the communication between said casing and conduit being directed to one compartment whereby a reduced air pressure at the open end of said conduit functions to actuate the diaphragm.

3. In an airplane angle-of-attack indicator, a conduit having an open end adapted for engagement with the leading edge of an airplane wing, an upwardly inclined sleeve communicating with the conduit, a rigid casing communicating with the sleeve, a flexible slack impervious diaphragm supported by the casing and dividing the casing into separate compartments, means carried by the casing for actuating a signal, and means carried by the diaphragm for operating said actuating means, said diaphragm being dependent upon its gravitational weight to maintain the means carried by the diaphragm normally out of actuating relationship, the communication between said casing and conduit being directed to one compartment whereby a reduced air pressure at the open end of said conduit functions to actuate the diaphragm.

4. In an airplane angle-of-attack indicator, a conduit having an open end adapted for engagement with the leading edge of an airplane wing, a downwardly extending tubular member communicating with the conduit and having a relatively small opening at the lowermost portion thereof, an upwardly inclined sleeve communicating with the conduit, a rigid casing communicating with the sleeve, a flexible slack impervious diaphragm supported by the casing and dividing the casing into separate compartments, means carried by the casing for actuating a signal, and means carried by the diaphragm for operating said actuating means, said diaphragm being dependent upon its gravitational weight to maintain the means carried by the diaphragm normally out of actuating relationship, the communication between said casing and conduit being directed to one compartment whereby a reduced air pressure at the open end of said conduit functions to actuate the diaphragm.

5. In an airplane angle-of-attack-indicator, a conduit having an open end adapted for engagement with the leading edge of an airplane wing, a downwardly extending tubular member communicating with the conduit and having a relatively small opening at the lowermost portion thereof, said small opening having an area in the order of $\frac{1}{2}_3$ of the area of the conduit opening, a rigid casing communicating with the conduit, a flexible slack impervious diaphragm supported by the casing and dividing the casing into separate compartments, means carried by the casing for actuating a signal, and means carried by the diaphragm for operating said actuating means, said diaphragm being dependent upon its gravitational weight to maintain the means carried by the diaphragm normally out of actuating relationship, the communication between said casing and conduit being directed to one compartment whereby a reduced air pressure at the open end of said conduit functions to actuate the diaphragm.

6. In an airplane angle-of-attack indicator, a conduit having an open end adapted for engagement with the leading edge of an airplane wing, a rigid casing communicating with the conduit, a flexible slack impervious diaphragm supported by the casing and dividing the casing into an upper and a lower compartment, electrical contact means carried by the casing within the upper compartment, and a metallic member carried by the diaphragm and movable with the diaphragm for engagement with said contact means, said diaphragm being dependent upon its gravitational weight to maintain the means carried by the diaphragm normally out of actuating relationship, the communication between said casing and conduit being directed to the upper compartment whereby a reduced air pressure at the open end of said conduit functions to actuate the diaphragm.

7. In an airplane angle-of-attack indicator, a conduit having an open end adapted for engagement with the leading edge of an airplane wing, a rigid casing communicating with the conduit, a flexible slack impervious diaphragm supported by the casing and dividing the casing into an upper and a lower compartment, the lower compartment of the casing having an opening therethrough to the prevailing atmosphere, electrical contact means carried by the casing within the upper compartment, and a metallic member carried by the diaphragm and movable with the diaphragm for engagement with said contact means, said diaphragm being dependent upon its gravitational weight to maintain the means carried by the diaphragm normally out of actuating relationship, the communication between said casing and conduit being directed to the upper compartment whereby a reduced air pressure at the open end of said conduit functions to actuate the diaphragm.

8. In an airplane angle-of-attack indicator, a conduit having an open end adapted for engagement with the leading edge of an airplane wing, a rigid casing communicating with the conduit, a flexible slack impervious diaphragm supported by the casing and dividing the casing into an upper and a lower compartment, said diaphragm being freely flexible and substantially impervious to passage of air therethrough, electrical contact means carried by the casing within the upper compartment, and a metallic member carried by the diaphragm and movable with the diaphragm for engagement with said contact means, said diaphragm being dependent upon its gravitational weight to maintain the means carried by the diaphragm normally out of actuating relationship, the communication between said casing and conduit being directed to the upper compartment whereby a reduced air pressure at the open end of said conduit functions to actuate the diaphragm.

9. In an airplane angle-of-attack indicator, a conduit having an open end adapted for engagement with the leading edge of an airplane wing, a rigid casing communicating with the conduit, a flexible slack impervious diaphragm supported by the casing, and dividing the casing into an upper and a lower compartment, said diaphragm being held in a normally horizontal position whereby at equalized pressure in both compartments the diaphragm assumes a slack position within the lowermost compartment, electrical contact means carried by the casing within the upper compartment, and a metallic member carried by the diaphragm and movable with the diaphragm for engagement with said contact means, said diaphragm being dependent upon its gravitational weight to maintain the means carried by the diaphragm normally out of actuating relationship, the communication between said casing and conduit being directed to the upper compartment whereby a reduced air pressure at the open end of said conduit functions to actuate the diaphragm.

10. In an airplane angle-of-attack indicator, a conduit having an open end adapted for engagement with the leading edge of an airplane wing, a rigid casing communicating with the conduit, a flexible slack impervious diaphragm supported by the casing and dividing the casing into an upper and a lower compartment, said diaphragm being freely flexible and substantially impervious to passage of air therethrough, said diaphragm being held in a normally horizontal position whereby at equalized pressure in both compartments the diaphragm assumes a slack position within the lowermost compartment, electrical contact means carried by the casing within the upper compartment, and a metallic member carried by the diaphragm and movable with the diaphragm for engagement with said contact means, said diaphragm being dependent upon its gravitational weight to maintain the means carried by the diaphragm normally out of actuating relationship, the communication between said casing and conduit being directed to the upper compartment whereby a reduced air pressure at the open end of said conduit functions to actuate the diaphragm.

11. In an airplane angle-of-attack indicator, a conduit having an open end adapted for engagement with the leading edge of an airplane wing, a rigid casing communicating with the conduit, a flexible impervious diaphragm supported by the casing and dividing the casing into an upper and a lower compartment, electrical contact means carried by the casing within the upper compartment, and a metallic member carried by the diaphragm and movable with the diaphragm for engagement with said contact means, said diaphragm being dependent upon its gravitational weight to maintain the means carried by the diaphragm normally out of actuating relationship, the distance between the contact means and the metallic member being at least ⅛ inch, the communication between said casing and conduit being directed to the upper compartment whereby a reduced air pressure at the open end of said conduit functions to actuate the diaphragm.

12. In an airplane angle-of-attack indicator, a rigid casing, a flexible slack impervious diaphragm positioned within the casing and dividing the casing into two compartments, communicating means extending from one compartment to a pressure zone at the exterior of an airplane wing, communicating means extending from the other compartment to a different pressure zone, and means associated with said diaphragm for operating a signal upon actuating of the diaphragm, said diaphragm being dependent upon its gravitational weight to maintain the means carried by the diaphragm normally out of actuating relationship.

RALPH H. UPSON.

REFERENCES CITED

The following references are of record in the file of this patent:

UNITED STATES PATENTS

| Number | Name | Date |
|---|---|---|
| 1,620,493 | Schindler | Mar. 8, 1927 |
| 2,075,305 | Sayre | Mar. 30, 1937 |
| 2,204,367 | Kollsman | June 11, 1940 |